US010625703B2

(12) United States Patent
Kobayashi et al.

(10) Patent No.: US 10,625,703 B2
(45) Date of Patent: Apr. 21, 2020

(54) SIDE AIR BAG DEVICE FOR VEHICLE (71) Applicant: AUTOLIV DEVELOPMENT AB, Vargarda (SE)

(72) Inventors: Yuto Kobayashi, Yokohama (JP); Yutaka Nakajima, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 186 days.

(21) Appl. No.: 15/563,194

(22) PCT Filed: Feb. 10, 2016

(86) PCT No.: PCT/JP2016/053917
§ 371 (c)(1),
(2) Date: Dec. 19, 2017

(87) PCT Pub. No.: WO2016/158022
PCT Pub. Date: Oct. 6, 2016

(65) Prior Publication Data
US 2018/0265032 A1 Sep. 20, 2018

(30) Foreign Application Priority Data
Mar. 30, 2015 (JP) .................. 2015-069343

(51) Int. Cl.
*B60R 21/231* (2011.01)
*B60R 21/207* (2006.01)
*B60R 21/00* (2006.01)

(52) U.S. Cl.
CPC ...... *B60R 21/23138* (2013.01); *B60R 21/207* (2013.01); *B60R 21/231* (2013.01);
(Continued)

(58) Field of Classification Search
CPC .................. B60R 2021/23146; B60R 21/231
See application file for complete search history.

(56) References Cited

U.S. PATENT DOCUMENTS 5,575,497 A * 11/1996 Suyama .............. B60R 21/231
280/730.1
6,976,702 B2 12/2005 Yokota et al.
(Continued)

FOREIGN PATENT DOCUMENTS

DE        19647611 A1 * 5/1998 ....... B60R 21/23138
JP        2001114060 A     4/2001
(Continued)

OTHER PUBLICATIONS

International Search Report of PCT/JP2016/053917, dated Apr. 26, 2016.

*Primary Examiner* — Nicole T Verley
(74) *Attorney, Agent, or Firm* — Dickinson Wright PLLC (57) ABSTRACT

A vehicle side airbag device including a shoulder protection part and a chest protection part that lifts an occupant's arm in a collision state while protecting the occupant's shoulder. A side airbag (1) is provided at a seat (2) and spread out in a non-inflated state, the contour on the front side in the vehicle body front-back direction has an inflection position C with a curvature change midway between the shoulder protection part X and the chest protection part Y, an upper edge line U upward and a lower edge line L downward from the inflection position. The inflection position is ahead of the shoulder protection part and above a center line F that extends lengthwise of an occupant upper arm A and divides the upper arm into upper and lower portions, and the lower edge line crosses the center line from an upper side to a lower side and positioned under the center line in a lower end position Au of the occupant upper arm.

11 Claims, 6 Drawing Sheets

(52) U.S. Cl.
CPC ............. *B60R 2021/0041* (2013.01); *B60R 2021/0058* (2013.01); *B60R 2021/23146* (2013.01)

(56) References Cited

U.S. PATENT DOCUMENTS

| | | | |
|---|---|---|---|
| 8,480,124 B2 | 7/2013 | Rickenbach et al. | |
| 9,254,811 B2 * | 2/2016 | Hayashi | B60R 21/231 |
| 9,399,440 B2 * | 7/2016 | Fujiwara | B60R 21/2346 |
| 9,623,829 B2 * | 4/2017 | Gwon | B60R 21/207 |
| 9,751,490 B1 * | 9/2017 | Kim | B60R 21/23138 |
| 9,783,149 B2 * | 10/2017 | Taguchi | B60R 21/207 |
| 9,789,841 B2 * | 10/2017 | Fujiwara | B60R 21/2346 |
| 10,166,945 B2 * | 1/2019 | Fujiwara | B60R 21/23138 |
| 2004/0119269 A1 | 6/2004 | Yokota et al. | |
| 2012/0181780 A1 | 7/2012 | Rickenbach et al. | |
| 2015/0115583 A1 * | 4/2015 | Azuma | B60R 21/231 280/740 |
| 2019/0118759 A1 * | 4/2019 | Kobayashi | B60R 21/23138 |

FOREIGN PATENT DOCUMENTS

| | | |
|---|---|---|
| JP | 2001171468 A | 6/2001 |
| JP | 2004196162 A | 7/2004 |
| JP | 2010132072 A | 6/2010 |
| JP | 2013147119 A | 8/2013 |
| JP | 2013154786 A | 8/2013 |
| JP | 2013216211 A | 10/2013 |
| JP | 2013252773 A | 12/2013 |
| JP | 2014502580 A | 2/2014 |
| JP | 2014088073 A | 5/2014 |
| JP | 6332527 B2 * | 5/2018 |
| WO | WO 2011/087026 A1 | 7/2011 |
| WO | WO 2012/099636 A1 | 7/2012 |
| WO | WO-2016152245 A1 * | 9/2016 ........... B60R 21/207 |

* cited by examiner

VEHICLE BODY WIDTHWISE DIRECTION

FIG. 3

VEHICLE BODY FRONT-BACK DIRECTION

FIG. 4

VEHICLE BODY WIDTHWISE DIRECTION

FIG. 5

VEHICLE BODY FRONT-BACK DIRECTION

FIG. 6

SIDE AIR BAG DEVICE FOR VEHICLE

CROSS-REFERENCE TO RELATED APPLICATION

This application is a 35 U.S.C. § 371 national phase application of International Application No.: PCT/JP2016/053917, filed Feb. 10, 2016, which claims the benefit of priority to Japanese Patent Application No.: 2015-069343, filed Mar. 30, 2015, the contents of which are incorporated herein by reference in their entirety.

FIELD OF THE INVENTION

The present invention relates to a vehicle side airbag device including a shoulder protection part and a chest protection part and being capable of protecting the chest appropriately depending on a collision state while protecting an occupant's shoulder by the shoulder protecting part.

BACKGROUND

Various vehicle side airbags equipped with features in consideration of protection of shoulders or upper arms have been known. An airbag for a side airbag device disclosed in Japanese Patent Application Publication No. 2001-114060 includes a base part provided on the back side to be positioned upstream of inflation gas during inflation and deployment and a main body part provided on the front side of the base part. The main body part includes a part that is recessed backward in a position corresponding to the vicinity of the shoulder of the occupant and lower and upper inflation parts that are branched to extend from the base part as a crossing position and positioned laterally to the chest and the head during inflation and deployment. A band-shaped tether that couples the vehicle inner side surface and the vehicle outer side surface is disposed inside the base part. The minimum opening area of the upper side flow passage on the upper edge side of the tether is set to be smaller than the minimum opening area of the lower side flow passage on the lower edge side of the tether.

A side airbag device disclosed in Japanese Patent Application Publication No. 2001-171468 includes a folded airbag stored in an inflatable and deployable manner at a side surface of the seat bag on the vehicle outer side. The airbag includes a base part to be positioned upstream of inflation gas during inflation and deployment and a main body part to be positioned in front of the base part during inflation and deployment. The main body part includes a lower inflation part to be positioned in front of the base part and an upper inflation part to be in communication with the upper part of the lower inflation part during inflation and deployment. The airbag has its upper inflation part folded into the lower inflation part in a flat spread out state and is internally rolled to the vehicle inner side along radial folding lines provided around the upper position of the base part so that the upper edge side comes closer to the base part side and stored in the folded state. According to the disclosure of Japanese Patent Application Publication No. 2001-171468, the airbag can be inflated and deployed with as little interference as possible with the arms of the occupant by displacement to the vehicle outer side even if the occupant's arms are positioned near the left and right edges of the seatback.

In a vehicle side airbag device disclosed in Japanese Patent Application Publication No. 2010-132072, an airbag is in a lower position than an armpit of an occupant on the vehicle front side of a shoulder restraining part and includes an arm support edge on which the upper arm of the occupant is to be placed. Therefore, when the upper arm of the occupant strikes the airbag after deployment of the airbag is completed, the upper arm of the occupant slides along the airbag to be placed on the arm support edge. Therefore, the amount of lapping between the upper arm and the chest of the occupant can be reduced as compared to conventional devices when viewed in the vehicle widthwise direction, so that the upper arm of the occupant can be restrained from coming between the chest of the occupant and the airbag.

A side airbag disclosed in Japanese Patent Application Publication No. 2013-147119, is a side airbag inflated and deployed to between an occupant and a door trim from a side of a seat and is formed to be inflated and deployed from the hip to the armpit of the occupant in the vehicle up-down direction, and the side airbag includes a surface inclined downward from the vehicle back side to the vehicle front side to have its upper part conform to the lower side of the upper arm of the occupant.

A side airbag device disclosed in Japanese Patent Application Publication No. 2013-216211, protects an occupant between the occupant and a side wall of the vehicle by an airbag adapted to protect the part of the body below the shoulders. The airbag has an inflation part formed by joining together opposed pieces of base fabric and a three-dimensionally shaped part. The opposed pieces of base fabric have a pair of notches formed in overlapping positions at a part of peripheral parts and joined in a stretched state in the thickness-wise direction of the inflation part. The three-dimensionally shaped part is positioned at the peripheral part of the inflation part and three-dimensionally formed in the thickness-wise direction of the inflation part by the joined pair of notches. In the disclosure of Japanese Patent Application Publication No. 2013-216211, an airbag is deployed on a side of the body, and the airbag in the process of deployment can be restrained from flipping up the upper arm of the occupant.

A side airbag device disclosed in Japanese Patent Application Publication No. 2014-88073 is a side airbag device including an airbag deployed in a space between a seated occupant and a door upon a vehicle side collision and an inflator that supplies the airbag with gas, and the airbag is separated at least into a first chamber supplied with gas directly from the inflator and deployed to a side of the shoulder of the occupant, a second chamber supplied with the gas supplied to the first chamber and deployed under the upper arm of the occupant, and a third chamber provided under the second chamber and supplied with the gas supplied to the second chamber and deployed.

A side airbag disclosed in Domestic Republication of PCT International Application No. WO 2011/087026, is a side airbag capable of restraining the arm from being pressed against the chest because of the inflation and sufficiently absorbing impact toward the chest, and the side airbag has an arm opposed part having a recessed shape and opposed to the arm of the occupant in a deployed state to push up the arm to such a position that the arm does not overlap the chest of the occupant.

In a vehicle side airbag device disclosed in Japanese Patent Application Publication No. 2013-154786, a main airbag part of the side airbag is inflated and deployed first on the vehicle back side of the upper arm of an occupant to come between the shoulder, chest, and hip of the occupant and a side door, and a sub bag part yet to be deployed is opposed to the back surface of the upper arm. The sub bag part is inflated and developed to push up the upper arm as the sewed part of the airbag tears by increase in the internal pressure after the main bag is completely inflated and deployed. At the time, force from the airbag can be prevented from being applied on the chest (ribs) through the upper arm bones, so that the internal pressure of the airbag can be set on the basis of the resistance of the ribs of the occupant.

Upon a collision against a side part of a vehicle such as a vehicle door, the vehicle side part may deform and have a dent and the like, so that a door trim, etc. may enter into the vehicle. At the time, a side airbag is inflated and deployed beside the occupant and carries out an occupant protecting function, while the arm of the occupant may be held between the chest and the inflated side airbag as described in some abovementioned documents, so that the arm of the occupant may be pressed against the chest and the chest may get injured. In order to avoid the situation, various side airbags configured to flip up the occupant's arm have been proposed.

However, it is undesirable for the arm to be flipped up in response to the completion of inflation and deployment of a side airbag in a collision level which does not exactly require the movement. Stated differently, the arm would preferably be protected by the side airbag instead of being flipped up in some cases.

On the other hand, it is important to protect the shoulders of the occupant, and there has been a demand for a new idea for a side airbag capable of protecting the chest by flipping up the arm as required and protecting the shoulder at the same time.

The present invention is in view of the problem associated with the conventional features, and it is an object of the invention to provide a vehicle side airbag device including a shoulder protection part and a chest protection part and capable of protecting the chest by the chest protection part that lifts the arm softly rather than flipping as required depending on a collision state while protecting the shoulder by the shoulder protection part.

SUMMARY

A vehicle side airbag device according to the present invention includes a side airbag provided at a seat and having at least a shoulder protection part that protects a shoulder of an occupant properly seated at the seat and a chest protection part that protects the chest of the occupant under the shoulder protection part. The side airbag is inflated and deployed by inflator gas forward in a front-back direction of a vehicle body between the seat and a vehicle body member on a side of the seat. When the side airbag is provided at the seat and spread out flat in a non-inflated state, a contour of the side airbag on a front side in the vehicle body front-back direction has, in a view in a widthwise direction of the vehicle body, an inflection position with a curvature change midway between the shoulder protection part and the chest protection part, an upper edge line oriented upward from the inflection position and a lower edge line oriented downward from the inflection position, the inflection position is positioned ahead of the shoulder protection part and above a center line that extends in a lengthwise direction of an upper arm of the occupant and divides the upper arm into upper and lower portions in a view in the vehicle body widthwise direction. The lower edge line crosses the center line from an upper side to a lower side and is positioned under the center line in a lower end position of the upper arm of the occupant.

The side airbag is deformed in a completely inflated and deployed state by being pressed by the vehicle body member which has been displaced, and the deformation preferably causes that the chest protection part is displaced upward at least from the inflection position along the lower edge line. The lower edge line preferably includes a downward inclined portion extending forward in the vehicle body front-back direction from a vicinity of the inflection position.

The side airbag is preferably subjected to a crash test using a dummy that is assumed to represent the occupant, and designed according to dimensions of the crash test dummy. The inflection position is desirably set near a lower end of the shoulder protection part. Preferably, the upper edge line includes at least a first curve that reaches the inflection position, and the lower edge line includes at least a second curve that reaches the inflection position.

The contour of the side airbag is preferably formed by a sewing line that forms the side airbag. The sewing line is preferably a ridge line that appears in a raised shape when the side airbag is completely inflated and deployed.

Desirably, the side airbag includes an inner bag therein, the inner bag is provided on a back side in the vehicle body front-back direction so that a main part thereof is positioned inside the seat in an inflated and deployed state, and the inner bag is provided with an inflator therein.

The inner bag preferably directs a flow of inflator gas filled therein to a vent hole formed in the side airbag when the occupant is not properly seated. The inner bag is desirably formed to have an elongate shape in an up-down direction of the vehicle body and spread downward in the vehicle body front-back direction.

The vehicle side airbag device according to the present invention includes the shoulder protection part and the chest protection part, and the chest can be protected by the chest protection part that lifts an arm (upper arm) softly rather than flipping as required depending on a collision state while a shoulder is protected by the shoulder protection part.

DETAILED DESCRIPTION

Figure 1:
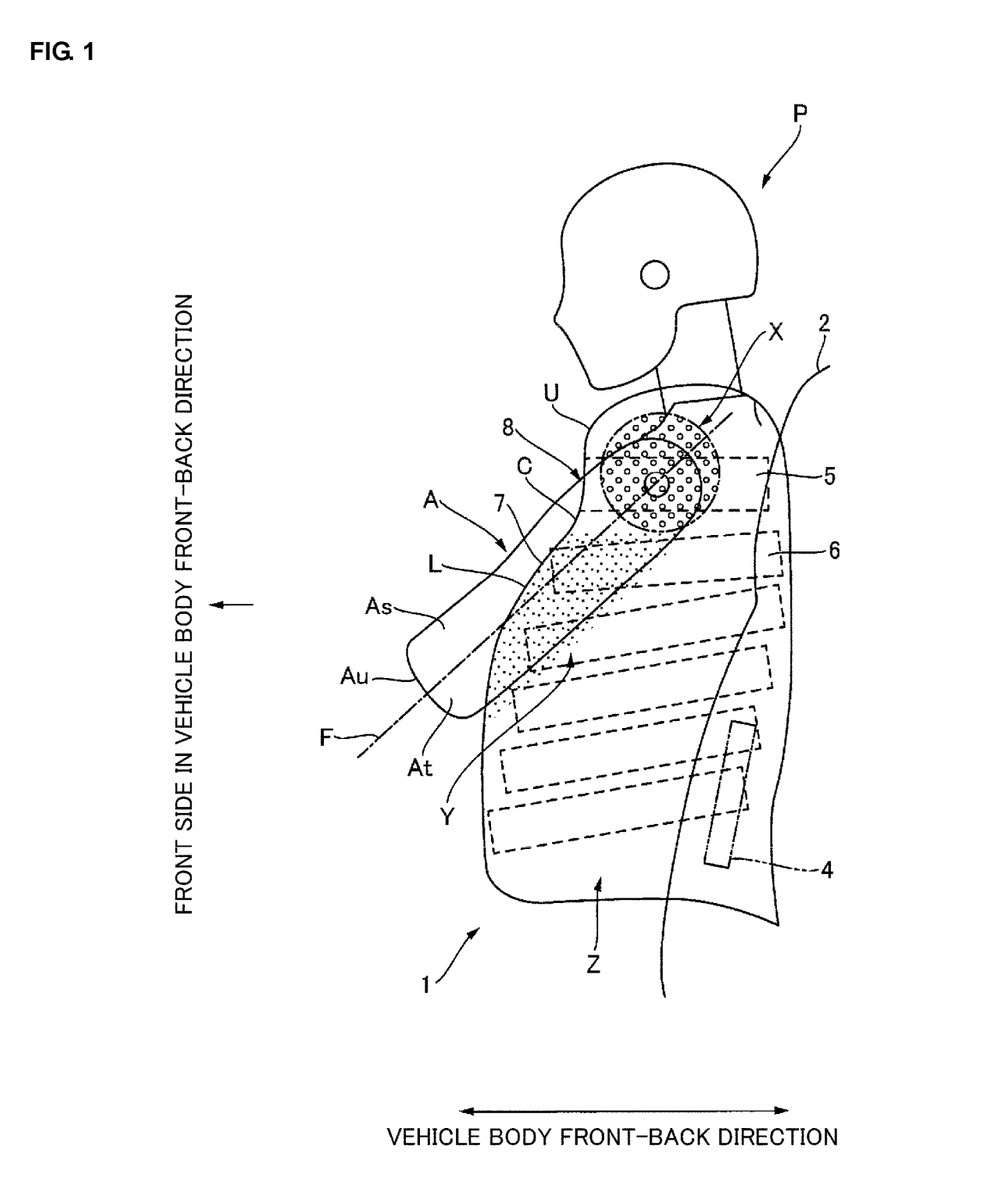
FIG. 1 is a side view of a vehicle side airbag device according to a preferred embodiment of the invention in the vehicle body widthwise direction, showing a side airbag provided at a seat and spread out flat in a non-inflated state.
Figure 2:
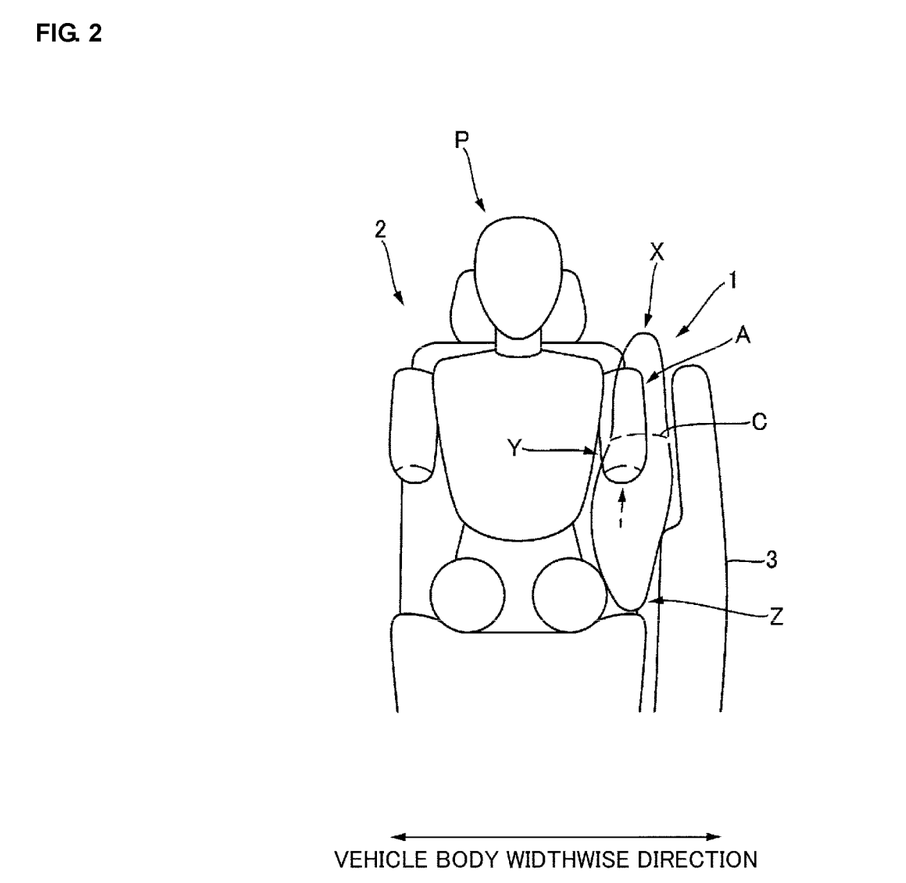
FIG. 2 is a front view of the side airbag in FIG. 1 in a completely inflated and deployed state viewed from the front side in the vehicle body front-back direction when a door of a vehicle body is not displaced.

Now, a vehicle side airbag device according to a preferred embodiment of the present invention will be described in detail with reference to the accompanying drawings. As shown in FIGS. 1 and 2, the vehicle side airbag device according to the embodiment includes a side airbag 1. As has been well known, the side airbag 1 is stored in a seat 2 disposed in a vehicle body to be inflated and deployed forward in the vehicle body front-back direction by inflator gas between the seat 2 and a vehicle body member 3 such as a door on a side of the seat and protect the occupant P against impact input from the side of the door. The inflator gas is ejected from an inflator 4 securely attached to the seat 2 and stored in the side airbag 1.

According to the design of the contour, the side airbag 1 has at least a shoulder protection part X (the range of which is indicated by distributed circles) that protects a shoulder of the occupant P properly seated at the seat 2 and a chest protection part Y (the range of which is indicated by distributed dots) that protects the chest of the occupant P under the shoulder protection part X and additionally includes a hip protection part Z that protects the hip and its periphery under the chest protection part Y.

As has been well known, the side airbag 1 is also formed to have a bag shape formed by joining together the peripheral edges of opposed pieces of base fabric for example by sewing and inflated and deployed from a stored state such as a folded state when filled inside with inflator gas.

Detailed specifications for the side airbag 1 that will be described are applied when the side airbag is designed for a crash test dummy assumed to represent the occupant P and according to the dimensions of the crash test dummy. Known examples of presently used crash test dummy include Hybrid-III50th, Hybrid-III5th, Hybrid-III95th LM, BioRID-II, RID-2, SID, EuroSID-1, SID-IIs, ES-2, ES-2re, P-series, CRABI, Hy3YO, Q3, Hy6yo, 3YO, Pedestrian, FAA, and WorldSID50th. However, the side airbag 1 according to the embodiment is not designed only for these crash test dummies but may be designed individually for any of other crash test dummies and specified according to the dimensions of these crash test dummies. In the following, the occupant P is described synonymously with the crash test dummy.

As shown in FIG. 1, the contour of the side airbag 1 when viewed in the vehicle body widthwise direction is defined on the basis of the following positional relation about the side airbag 1 securely provided at the seat 2 and spread out flat in a non-inflated state without being filled with inflator gas. Therefore, the positional relation is different from that of the side airbag 1 filled with the inflator gas in a completely inflated and deployed state.

In the design focused on meeting a first specification (Specification #1), the flat spread out side airbag 1 on the front side in the vehicle body front-back direction has a contour that includes an inflection position C, an upper edge line U, and a lower edge line L. The upper edge line U is positioned ahead of the shoulder protection part X in the vehicle front-back direction. The lower edge line L is positioned on the front side of the chest protection part Y in the vehicle front-back direction. Therefore, the upper edge line U belongs to the shoulder protection part X, and the lower edge line L belongs to the chest protection part Y.

The upper edge line U and the lower edge line L may be curved or linear in the vicinity of the inflection position C. The inflection position C is positioned at or near midway between the shoulder protection part X and the chest protection part Y, i.e., in the position where the lower end of the upper edge line U and the upper end of the lower edge line L are connected.

The inflection position C refers to the position where the upper edge line U and the lower edge line L having different curvatures (or different inclinations with respect to the horizontal direction for straight lines) are connected to each other with no curvature modification, and there is an extreme curvature (inclination) change in the connected position. The upper edge line U is upward oriented from the inflection position C as the front edge of the shoulder protection part X, and the lower edge line L is downward oriented from the inflection position C as the front edge of the chest protection part Y.

In a design focused on meeting a second specification (Specification #2), the inflection position C is positioned with respect to an upper arm A of the occupant P as follows. The upper arm A refers to the part of the arm from the shoulder joint to the elbow joint, and its lengthwise direction refers to the direction from the shoulder joint to the elbow joint. When viewed in the vehicle body widthwise direction, a center line F is assumed to extend in the lengthwise direction of the upper arm A, and the upper arm A is divided into an upward facing side As and a downward facing side At with respect to the center line F.

The inflection position C on the front side in the vehicle front-back direction is positioned ahead of the shoulder protection part X and above the center line F when viewed in the vehicle body widthwise direction. Therefore, the inflection position C is positioned ahead of the shoulder of the occupant P protected by the shoulder protection part X and adjacent to the upward facing side As of the upper arm A of the occupant P from the lateral in the vehicle body widthwise direction.

In a design focused on meeting a third specification (Specification #3), the lower edge line L is positioned with respect to the upper arm A of the occupant P as follows. The lower edge line L is positioned to cross the center line F from the upper side to the lower side. Therefore, the lower edge line L passes the upward facing side As and then the downward facing side At of the upper arm A of the occupant P and is positioned adjacent to the upper arm A from the lateral side in the vehicle body widthwise direction. The lower edge line L is also positioned below the center line F in a lower end position (the position of the elbow joint) Au of the upper arm A of the occupant P. In this way, the lower edge line L is positioned so that the line can get under the upper arm A in the elbow joint position.

The inflection position C is set in the vicinity of the lower end of the shoulder protection part X so that the shoulder protection function by the shoulder protection part X and the behavior to lift up the upper arm A caused by the upward displacement of the chest protection part Y that will be described do not interfere with each other.

According to the embodiment, the upper edge line U includes at least a first curve that reaches the inflection position C, and the lower edge line L includes at least a second curve that reaches the inflection position C, so that the inflection position C is continuous with a change in the curvature and a change in the radius of curvature. In this way, a smooth inflation form around the inflection position C may be provided.

The parts of the contour of the side airbag 1 when viewed in the vehicle body widthwise direction on the lower side in the vehicle body up-down direction and on the back side in the vehicle body front-back direction that are continuous with the lower edge line L may be formed to have any appropriate shape, and the shoulder protection part X is formed to spread at least corresponding to the shoulder of the occupant P and the periphery thereof at the upper side part in the vehicle body up-down direction that is continuous with the upper edge line U. The upper end of the shoulder protection part X is preferably set from under the jaw of the occupant P to the upper end of the shoulder.

Parts of a crash test dummy (WorldSID50th) will be described by way of illustration. Preferably, the inflection position C is positioned between a shoulder rib 5 and an upper chest rib 6 and behind the front end of the upper chest rib 6 in the vehicle body front-back direction, and the lower edge line L is set from between the shoulder rib 5 and the upper chest rib 6 to between a position under the center line F in the lower end position Au of the upper arm A and the vicinity of the lower part of the lower end position Au.

More specifically, the lower edge line L includes a downward inclined portion 7 in a shape that protrudes forward in the vehicle body front-back direction from the vicinity of the inflection position C and conforms to the upper arm A. The downward inclined portion 7 is provided to conform to the upper arm A and can get under the upper arm A in the lower end position (elbow joint position) Au of the upper arm A when the side airbag 1 is deployed, so that the behavior of the lower edge line L to get under the upper arm can be smooth.

Figure 3:
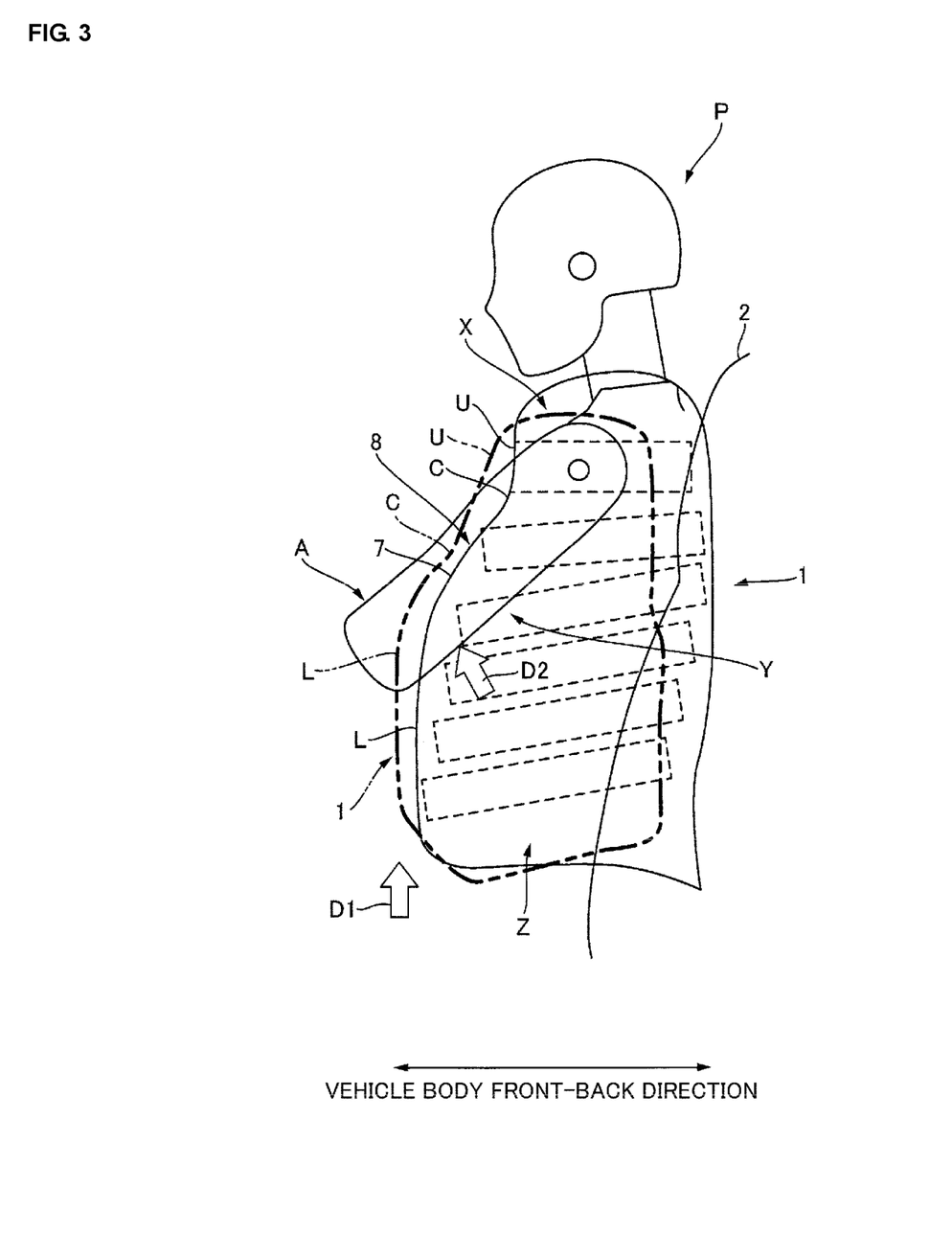
FIG. 3 is a side view of the side airbag in FIG. 1 in the vehicle body widthwise direction in a completely inflated and deployed state denoted by the two-dot chain line.

When inflated and deployed by inflator gas filled therein, the side airbag 1 tends to move slightly forward in the vehicle body front-back direction as indicated by the two-dot chain line with respect to the position occupied by the side airbag 1 disposed at the seat 2 in a non-inflated and folded state as indicated by the solid line in FIG. 3. Then, the entire side airbag 1 rises upward by displacement of a vehicle body member 3 such as a door. Then, according to the above-described specifications, while the side airbag 1 is disposed at the seat 2, the shape of the side airbag 1 is set with respect to the position occupied by the side airbag 1 that is spread out flat in a non-inflated and folded state.

It is determined whether the contour of the side airbag 1 on the front side in the vehicle body front-back direction satisfies the specifications on the basis of the thus set outer peripheral form of the side airbag 1 in a non-deployed state.

The contour of the side airbag 1 is formed by the sewing line that forms the side airbag 1. In this way, it is determined whether the contour of the side airbag 1 on the front side in the vehicle body front-back direction satisfies the specifications without adding any special configuration.

Figure 4:
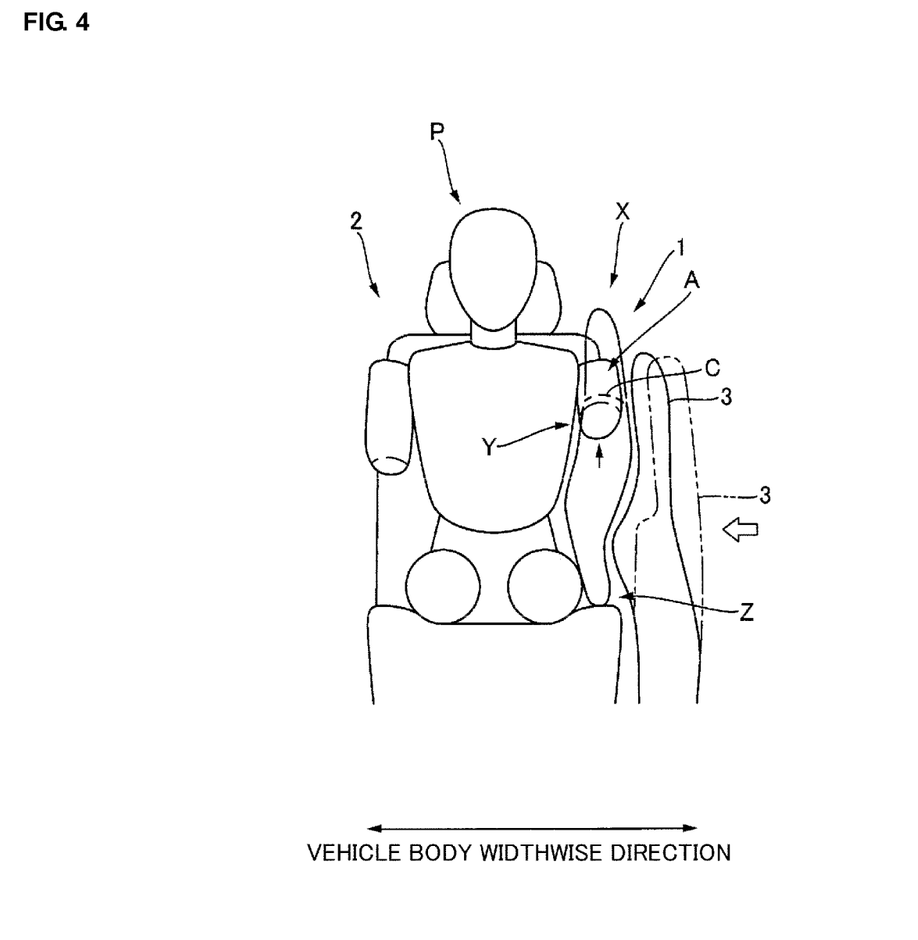
FIG. 4 is a front view of the side airbag in FIG. 1 in a completely inflated and deployed state viewed from the front side in the vehicle body front-back direction when the door of the vehicle body is displaced.

The side airbag 1 is deformed and flattened when pressed in the thickness-wise direction (vehicle body widthwise direction). As shown in FIG. 4, when the vehicle body member 3 such as a door is displaced to move toward the vehicle inner side in the vehicle body widthwise direction, the side airbag 1 is pressed between the vehicle body member 3 such as a door trim and the occupant P, so that the side airbag 1 is deformed and flattened while rising upward in the vehicle body up-down direction (see the arrow D1 in FIG. 3).

The deformation causes the chest protection part Y at least from the inflection position C along the lower edge line L to be displaced upward (see the arrow D2 in FIG. 3).

The contour of the side airbag 1 on the front side in the vehicle body front-back direction is formed by the sewing line, and the sewing line forms a ridge line 8 that appears in an outwardly raised shape along the periphery of the side airbag 1 when the side airbag 1 is completely inflated and deployed. More specifically, the sewing line is the ridge line 8 that appears when the side airbag 1 is completely inflated and deployed.

Now, the function of the vehicle side airbag device according to the embodiment will be described. Upon a vehicle collision, the side airbag 1 including the configuration can be inflated and deployed between the occupant P and the vehicle body member 3 such as a door on the side of the occupant P by the inflator gas as shown in FIG. 2.

When the side airbag 1 is completely inflated and deployed and the vehicle body member 3 such as a door trim enters only shallowly to the inner side of the vehicle body, the pressure large enough to flatten the side airbag 1 is not applied on the side airbag 1.

When the side airbag 1 is not deformed by the pressure, the lower edge line L of the chest protection part Y gets slightly under the upper arm A of the occupant P, and the chest protection part Y of the side airbag 1 can partly support the upper arm A of the occupant P from under or slightly lift up the upper arm. The shoulder protection part X including the upper edge line U above the inflection position C can cover the shoulder of the occupant P from the lateral side (in the vehicle body widthwise direction) for protection.

On the other hand, when the side airbag 1 is completely inflated and deployed and the vehicle body member 3 such as a door trim enters deeply to the vehicle inner side, the pressure for flattening the side airbag 1 is applied on the side airbag 1 as shown in FIGS. 3 and 4.

When pressed by the vehicle body member 3 such as a door trim and deformed, the side airbag 1 rises upward in the vehicle body up-down direction (see the arrow D1), and the chest protection part Y from the inflection position C to the lower edge line L is displaced upward (see the arrow D2). The upward displacement allows the lower edge line L to get under the upper arm A of the occupant P and the upper arm A to be lifted to about the height of the shoulder of the occupant P softly rather than instantaneously flipping up the upper arm A. In the lifting operation, the downward inclined portion 7 of the lower edge line L allows the lower edge line L to get under the upper arm smoothly without flipping up the upper arm A, and the upper arm A can rise surely and smoothly.

When the upper arm A is flipped up, the side airbag 1 in the process of inflation and deployment may directly strike a side of the chest of the occupant P while being pushed by the vehicle body member 3, and undesirable loads may be inflicted upon the chest, but the operation of lifting the upper arm A softly can prevent the upper arm A of the occupant P from being pressed against the chest or the side airbag 1 from striking the chest, so that a likelihood of damage upon the chest can be reduced. The shoulder protection part X including the upper edge line U above the inflection position C can cover the shoulder of the occupant P from the lateral side (in the vehicle body widthwise direction) for protection similarly to the case in which the vehicle body member 3 such as a door trim enters shallowly.

As in the foregoing, in the vehicle side airbag device according to the embodiment, in a collision state in which the vehicle body member 3 such as a door trim enters much to the inner side of the vehicle body and it is preferable to lift up the upper arm A, upward displacement of the chest protection part Y at least from the inflection position C along the lower edge line L allows the upper arm A of the occupant P to be lifted preferably closer to the lower edge line L taking advantage of the larger amount of flattening deformation of the side airbag 1, while in a collision state in which the vehicle body member 3 such as a door trim does not enter much to the inner side of the vehicle body, so that the upper arm A does not have to be lifted, the positional relation that allows the lower edge line L to be positioned around under the upper arm A of the occupant P is defined with respect to the side airbag 1, the upper edge line U is defined with respect to the side airbag 1 so that the shoulder protection part X can protect the shoulder of the occupant P, and the inflection position C separates between the upper edge line U and the lower edge line L, so that the function of protecting the occupant by the shoulder protection part X on the side of the upper edge line U and the function of protecting the occupant by the chest protection part Y on the side of the lower edge line L do not interfere with each other, and the chest protection by lifting the upper arm A as required depending on a collision state and the shoulder protection by the shoulder protection part X can be achieved at the same time.

Since the side airbag 1 in a completely inflated and deployed state is deformed and pressed by the displaced vehicle body member 3 such as a door and the chest protection part Y at least from the inflection position C along the lower edge line L is displaced upward, whether to lift the upper arm A is controlled depending on the pressed state of the side airbag 1 by the vehicle body member 3, and the upper arm A can be lifted only in a required collision state without causing the upper arm A to be unnecessarily flipped up.

The lower edge line L includes the downward inclined portion 7 from the vicinity of the inflection position C to the front side in the vehicle body front-back direction, and therefore the behavior of lower edge line L capable of getting under the upper arm A to get under the upper arm can be smooth.

The side airbag 1 is designed according to the dimensions of a crash test dummy assumed to represent an occupant, the side airbag 1 that satisfies Specifications #1, #2, and #3 can be produced according to individual external dimensions of a range of crash test dummies. Preferably, the side airbag adapted to WorldSID50th among the crash test dummies can provide appropriate occupant restraining performance to cope with greater kinds of events.

The inflection position C is set in the vicinity of the lower end of the shoulder protection part X, and therefore the shoulder protection function by the shoulder protection part X and the behavior of lifting the upper arm A caused by the upward displacement of the chest protection part Y can be prevented from interfering with each other.

The upper edge line U includes at least the first curve that reaches the inflection position C, and the lower edge line L includes at least the second curve that reaches the inflection position C, so that the inflection position C is continuous with a change in the curvature and a change in the radius of curvature, so that a smooth inflation state around the inflection position C can be provided.

The contour of the side airbag 1 on the front side in the vehicle body front-back direction is designed in a state yet to be inflated and folded. When the side airbag 1 is completely inflated and deployed, the ridge line 8 that appears in a raised shape formed by the sewing line defines the contour.

The ridge line 8 is formed by the sewing line that forms the side airbag 1, and the shape after the completion of the inflation and deployment may be predicted from the non-inflated state to some extent, accurate designing and production of the side airbag 1 can be readily carried out.

Figure 5:
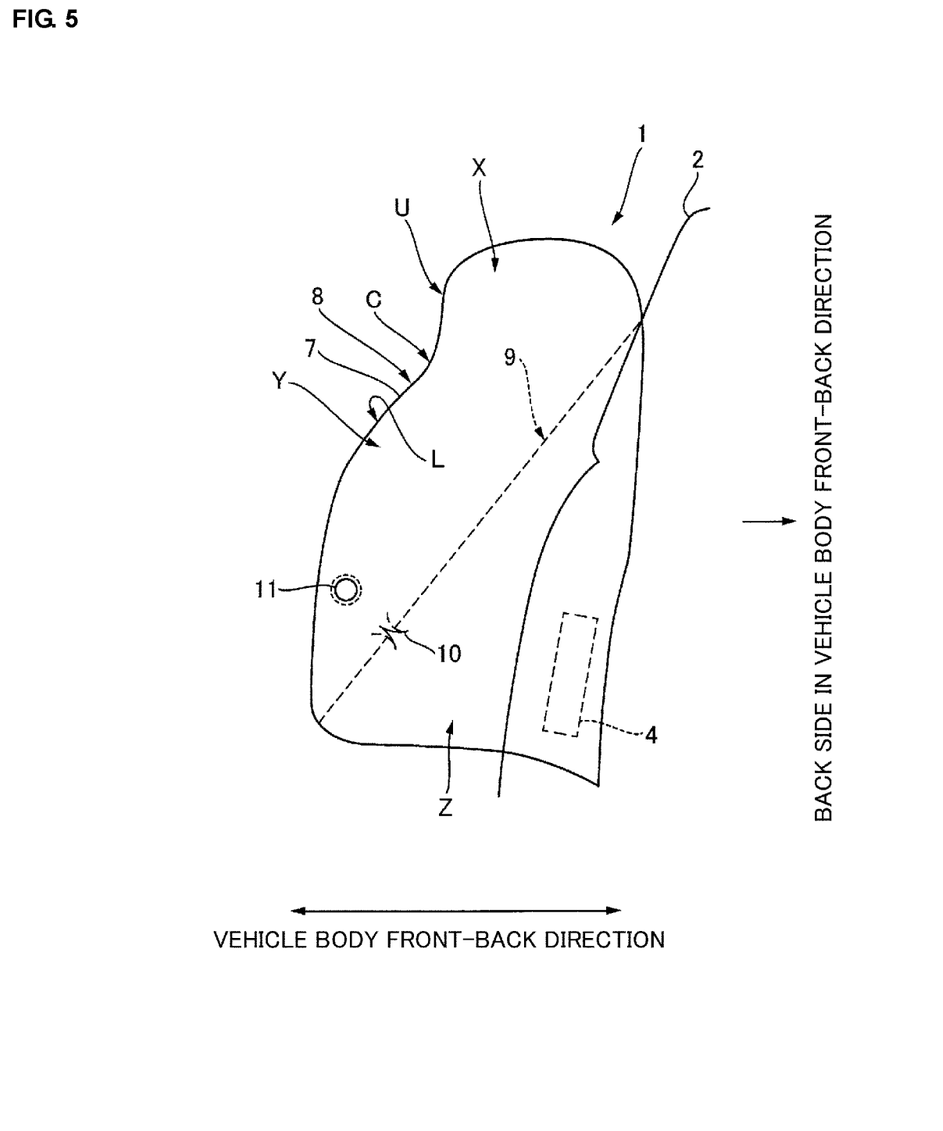
FIG. 5 is a side view of a modification of the vehicle side airbag device according to the invention in the vehicle body widthwise direction, showing a side airbag provided at a seat and spread out flat in a non-inflated state.
Figure 6:
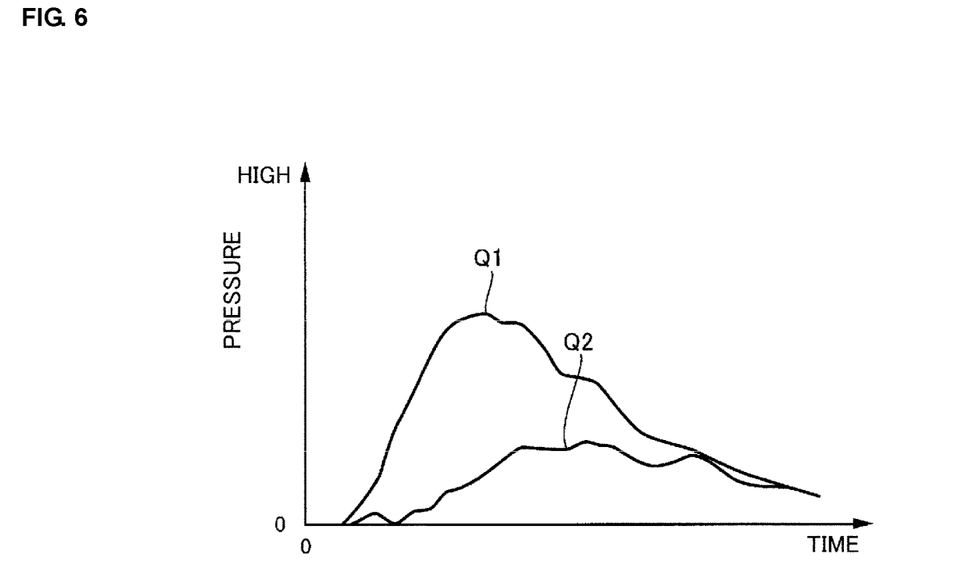
FIG. 6 is a graph showing change over time in the pressure in an inner bag and a side airbag when the inner bag in FIG. 5 is provided.

FIGS. 5 and 6 show a modification of the vehicle side airbag device according to an alternate embodiment of the invention. In the modification, an inner bag 9 is provided inside the side airbag. FIG. 5 is a side view of a side airbag provided at a seat and spread out flat in a non-inflated state in the vehicle body widthwise direction, and FIG. 6 is a graph showing change over time in the pressure in the inner bag and the side airbag when the inner bag is provided.

As shown in FIG. 5, the inner bag 9 is provided in the side airbag 1 to have a large part thereof positioned in the seat 2 on the back side when the side airbag 1 is divided into the front and back sides in the vehicle body front-back direction. In this way, the side airbag 1 can be deployed more safely and stably.

Similarly to the side airbag 1, the inner bag 9 is formed into a bag shape by joining together the peripheral edges of opposed pieces of base fabric for example by sewing and inflated and deployed when filled therein with inflator gas. The inflator 4 is provided in the inner bag 9.

The inner bag 9 is provided with a vent valve 10 opened in response to increase in the internal pressure to bring the inside of the inner bag 9 and the inside of the side airbag 1 into communication, and inflator gas introduced into the inner bag 9 is introduced into the side airbag 1 with time delay. Therefore, inflation and deployment of the inner bag 9 is completed prior to the completion of inflation and deployment of the side airbag 1.

For example, as shown in FIG. 6, in the configuration with the inner bag 9, high inner bag internal pressure Q1 is instantaneously generated in the inner bag, and then the inner bag internal pressure Q1 is gradually lowered while side airbag internal pressure Q2 lower than the inner bag internal pressure Q1 is obtained in the side airbag 1.

Therefore, depending on the manner of providing the inner bag 9, the occupant P who is not properly seated can be restrained during deployment of the side airbag 1. In addition, using the inner bag 9, the side airbag 1 itself can be more deployable.

According to the modification, the inner bag 9 has its main part positioned in the seat when the side airbag 1 is inflated and deployed. In the illustrated example, the inner bag 9 is formed to have an elongate shape in the vehicle body up-down direction and spread downward in the vehicle body front-back direction, such as a substantially triangular shape in a side view and partly protrudes forward in the vehicle body front-back direction. In this way, undesirable loading acting on the occupant P who is not properly seated can be reduced, while the part around the hip to the chest of the occupant P seated at the seat 2 can be supported by the inner bag 9 instantaneously by proper internal pressure.

As shown in FIG. 5, the vent valve 10 of the inner bag 9 is formed to direct the flow of the inflator gas filled inside to a vent hole 11 formed at the side airbag 1 when the occupant P is not properly seated. The vent hole 11 is provided to discharge the inflator gas after the side airbag 1 is completely inflated and deployed.

The inflator gas coming into the side airbag 1 from the inner bag 9 through the vent valve 10 can be discharged immediately and directly from the vent hole 11 by directing the flow of the inflator gas from the vent valve 10 to the vent hole 11, for example simply by providing the vent valve 10 and the vent hole 11 to face each other, so that the inflation and deployment force of the side airbag 1 can be lowered, and the restraining force by the side airbag 1 can be prevented from excessively acting on the occupant P who is seated improperly.

In the modification in which the inner bag 9 is provided inside the side airbag 1, the same advantageous functions and effects as those of the vehicle side airbag according to the embodiment can be provided.

The vehicle side airbag device described above is a preferable example of the present invention and can be implemented or carried out by various other methods. In particular, the shapes, sizes, configurations, and positional arrangements of parts shown in the accompanying drawings do not limit the present invention unless otherwise specified in the specification of the present application. The expressions and terms herein are used for the purpose of description only and should not be construed as limitative unless otherwise specified.

While the above description constitutes the preferred embodiments of the present invention, it will be appreciated that the invention is susceptible to modification, variation and change without departing from the proper scope and fair meaning of the accompanying claims.

The invention claimed is:

1. A vehicle side airbag device for protecting an occupant having an upper arm, the vehicle side airbag device comprising,
    a side airbag provided at a seat and having at least a shoulder protection part adapted to protect a shoulder of the occupant seated at the seat and a chest protection part adapted to protect a chest of the occupant under the shoulder protection part, the side airbag being inflated and deployed by inflator gas from an inflator forward in a front-back direction of a vehicle body between the seat and a vehicle body member on a side of the seat, wherein
    when the side airbag is provided at the seat and spread out flat in a non-inflated state, a contour of the side airbag on a front side in the vehicle body front-back direction has, in a view of a widthwise direction of the vehicle body, an inflection position with a curvature change between the shoulder protection part and the chest protection part, an upper edge line oriented upward from the inflection position as a front edge of the shoulder protection part, and a lower edge line oriented downward from the inflection position as a front edge of the chest protection part,
    the inflection position is formed between the upper edge line and the lower edge line, and the inflection position forms a concave surface and the upper and lower edge lines form a convex surface, respectively, and
    the inflection position is positioned at an ahead location of the shoulder protection part.

2. The vehicle side airbag device according to claim 1, wherein the side airbag is deformed, in an inflated and deployed state, by being pressed by a vehicle body member which has been displaced, and the deformation causes the chest protection part to be displaced upward at least from the inflection position along the lower edge line.

3. The vehicle side airbag device according to claim 1, wherein the lower edge line includes a downward inclined portion extending forward in the vehicle body front-back direction from a vicinity of the inflection position.

4. The vehicle side airbag device according to claim 1, wherein the side airbag is subjected to a crash test using a dummy that is assumed to represent the occupant, and the inflection position corresponds to dimensions of the crash test dummy.

5. The vehicle side airbag device according to claim 1, wherein the inflection position is set near a lower end of the shoulder protection part.

6. The vehicle side airbag device according to claim 1, wherein the upper edge line includes at least a first curve that reaches the inflection position, and the lower edge line includes at least a second curve that reaches the inflection position.

7. The vehicle side airbag device according to claim 1, wherein the contour of the side airbag is formed by a sewing line that forms the side airbag.

8. The vehicle side airbag device according to claim 1, wherein
    the side airbag includes an inner bag therein, and forming a forward side airbag portion oriented forward of the inner bag in the vehicle body front-back direction,
    the inner bag is provided on a back side in the vehicle body front-back direction so that a main part thereof is positioned inside the seat in an inflated and deployed state, and
    the inner bag is provided with an inflator therein.

9. The vehicle side airbag device according to claim 8, wherein the inner bag directs a flow of inflator gas filled therein to a vent hole formed in the side airbag when the occupant is not properly seated.

10. The vehicle side airbag device according to claim 8, wherein the inner bag is formed to have an elongate shape in an up-down direction of the vehicle body and spread downward in the vehicle body front-back direction.

11. The vehicle side airbag device according to claim 8, wherein the inner bag is first filled by a flow of inflator gas and the gas thereafter passes to the forward side bag portion through a vent valve formed in a partition dividing the inner bag and the forward side airbag portion.

* * * * *